United States Patent
Kumar et al.

(10) Patent No.: US 12,092,140 B2
(45) Date of Patent: Sep. 17, 2024

(54) FASTENING CLIP

(71) Applicant: Illinois Tool Works Inc., Glenview, IL (US)

(72) Inventors: Ganesh Kumar, Maharashtra (IN); Mahantesh S. Gokavi, Maharashtra (IN); Allande Johnson, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 17/792,957

(22) PCT Filed: Jan. 27, 2021

(86) PCT No.: PCT/IB2021/050611
§ 371 (c)(1),
(2) Date: Jul. 14, 2022

(87) PCT Pub. No.: WO2021/152468
PCT Pub. Date: Aug. 5, 2021

(65) Prior Publication Data
US 2023/0033207 A1   Feb. 2, 2023

(30) Foreign Application Priority Data
Jan. 27, 2020   (IN) .............................. 202021003647

(51) Int. Cl.
*F16B 21/00* (2006.01)
*F16B 21/07* (2006.01)
(Continued)

(52) U.S. Cl.
CPC ........ *F16B 21/075* (2013.01); *B60R 13/0206* (2013.01); *F16B 2/22* (2013.01)

(58) Field of Classification Search
CPC .............................. B60R 13/0206; F16B 2/22
(Continued)

(56) References Cited

U.S. PATENT DOCUMENTS 2,225,472 A * 12/1940 Franklin ................. F16B 9/056
277/606
2,741,938 A * 4/1956 Johnson ................ F16B 21/075
411/510
(Continued)

FOREIGN PATENT DOCUMENTS

DE   202007002704   7/2008
DE   102012001195   7/2013
(Continued)

OTHER PUBLICATIONS

Int'l Search Report and Written Opinion Appln No. PCT/IB2021/050611 mailed May 31, 2021.
(Continued)

*Primary Examiner* — Gary W Estremsky
(74) *Attorney, Agent, or Firm* — McAndrews, Held & Malloy, Ltd.

(57) ABSTRACT

A fastening clip (100), for securing a first component (200) and a second component (300), includes a body portion (102) and a collar (104) formed at an edge of the body portion (102). The body portion (102) includes a flat surface (106) having a first face and a second face, a locking element (110) extending from the first face of the flat surface (106) and adapted to detachably couple to the first component (200), and a plurality of engagement portions (108) extending from the first face of the flat surface (106) and adapted to detachably couple to the second component (300). The collar (104) includes a first flange (112) extending from the second face in an opposite direction from the plurality of
(Continued)

engagement portions. The first flange (112) is flexible and is adapted to abut against the first component (200).

20 Claims, 10 Drawing Sheets

(51) Int. Cl.
  *B60R 13/02* (2006.01)
  *F16B 2/22* (2006.01)
(58) Field of Classification Search
  USPC .................................................. 411/508, 510
  See application file for complete search history.

(56) References Cited

U.S. PATENT DOCUMENTS

| | | | |
|---|---|---|---|
| 3,262,168 A * | 7/1966 | Overhoff | F16B 5/128 |
| | | | 24/297 |
| 4,122,583 A | 10/1978 | Grittner | |
| 4,717,301 A | 1/1988 | Oddenino | |
| 4,920,618 A | 5/1990 | Iguchi | |
| 4,960,354 A | 10/1990 | Moore | |
| 5,051,021 A | 9/1991 | Pelz | |
| 5,195,793 A | 3/1993 | Maki | |
| 5,301,396 A | 4/1994 | Benoit | |
| 5,314,280 A * | 5/1994 | Gagliardi | B62D 27/026 |
| | | | 411/258 |
| 5,509,182 A | 4/1996 | Nakanishi | |
| 5,606,784 A * | 3/1997 | Hamamoto | F16B 45/005 |
| | | | 410/116 |
| 5,671,513 A * | 9/1997 | Kawahara | F16B 21/06 |
| | | | 411/508 |
| 5,857,244 A * | 1/1999 | Edwards | F16B 21/086 |
| | | | 24/453 |
| D405,828 S | 2/1999 | Richter | |
| 6,047,675 A | 4/2000 | Kunz | |
| 6,231,109 B1 | 5/2001 | Beaver | |
| 6,253,423 B1 | 7/2001 | Friedrich | |
| 6,264,393 B1 * | 7/2001 | Kraus | F16B 5/0657 |
| | | | 24/297 |
| 6,712,329 B2 | 3/2004 | Ishigami et al. | |
| 6,715,185 B2 | 4/2004 | Angellotti | |
| 6,769,849 B2 * | 8/2004 | Yoneoka | F16B 19/1081 |
| | | | 411/41 |
| 6,796,006 B2 | 9/2004 | Hansen | |
| 6,854,946 B2 | 2/2005 | Bauer | |
| D510,257 S | 10/2005 | Marty | |
| 7,114,221 B2 | 10/2006 | Gibbons | |
| 7,152,281 B2 | 12/2006 | Scroggie | |
| 7,178,855 B2 | 2/2007 | Catron | |
| 7,401,388 B2 | 7/2008 | Hansen | |
| 7,413,371 B2 | 8/2008 | Arnold | |
| D625,580 S | 10/2010 | Giordano | |
| 7,900,953 B2 | 3/2011 | Slobodecki | |
| 7,954,205 B2 | 6/2011 | Xueyong | |
| 8,046,880 B2 | 11/2011 | Katoh | |
| 8,322,001 B2 | 12/2012 | Ehrhardt | |
| 8,511,631 B2 | 8/2013 | Kato | |
| 8,528,295 B2 | 9/2013 | Glynn | |
| 8,585,121 B2 * | 11/2013 | Marx | F16B 21/02 |
| | | | 24/297 |
| 8,613,128 B2 | 12/2013 | Moerke | |
| 8,671,528 B2 | 3/2014 | Hayashi | |
| 8,683,662 B2 | 4/2014 | Cooley | |
| 8,834,087 B2 | 9/2014 | Kirchen | |
| 8,875,357 B2 | 11/2014 | Réznar | |
| 8,979,156 B2 | 3/2015 | Mally | |
| 9,079,341 B2 | 7/2015 | Risdale | |
| 9,303,665 B2 | 4/2016 | Steltz | |
| D759,475 S | 6/2016 | Banno | |
| D759,476 S | 6/2016 | Toshio | |
| D767,372 S | 9/2016 | Itou | |
| 9,982,694 B2 | 5/2018 | Scroggie | |
| 10,125,804 B2 | 11/2018 | Krippl | |
| D845,120 S | 4/2019 | Kosidlo | |
| 10,471,909 B2 | 11/2019 | Abe | |
| D876,207 S | 2/2020 | Elliott | |
| 10,968,931 B1 * | 4/2021 | Forti | F16B 5/0664 |
| D934,063 S | 10/2021 | Buczynski | |
| D936,458 S | 11/2021 | Wu | |
| 2003/0200634 A1 | 10/2003 | Hansen | |
| 2004/0016088 A1 | 1/2004 | Angellotti | |
| 2005/0079009 A1 * | 4/2005 | Benedetti | F16B 21/075 |
| | | | 403/329 |
| 2007/0107174 A1 | 5/2007 | Bordas | |
| 2008/0052878 A1 | 3/2008 | Lewis | |
| 2009/0188086 A1 | 7/2009 | Okada | |
| 2010/0146747 A1 | 6/2010 | Reznar | |
| 2012/0073089 A1 | 3/2012 | Buillas | |
| 2015/0113773 A1 | 4/2015 | Iwahara | |
| 2015/0128386 A1 | 5/2015 | Lepper | |
| 2015/0321622 A1 * | 11/2015 | Dickinson | F16B 5/065 |
| | | | 24/458 |
| 2015/0322985 A1 | 11/2015 | Scroggie | |
| 2015/0337882 A1 | 11/2015 | Iwahara | |
| 2016/0129854 A1 | 5/2016 | Bachelder | |
| 2016/0290380 A1 | 10/2016 | Fellows | |
| 2016/0368433 A1 | 12/2016 | Vega Velazquez | |
| 2017/0051780 A1 | 2/2017 | Dickinson | |
| 2017/0129421 A1 | 5/2017 | Dickinson | |
| 2017/0268550 A1 | 9/2017 | Michelini | |
| 2018/0128297 A1 | 5/2018 | Meyers | |
| 2019/0048911 A1 | 2/2019 | Bidlake | |
| 2020/0232495 A1 | 7/2020 | Lepper | |
| 2021/0221492 A1 | 7/2021 | Vincon | |
| 2021/0276497 A1 | 9/2021 | Buczynski | |

FOREIGN PATENT DOCUMENTS

| | | |
|---|---|---|
| EP | 1363069 | 11/2003 |
| EP | 3557086 | 10/2019 |
| GB | 2167515 | 5/1986 |
| WO | 2015175098 | 11/2015 |
| WO | 2016073231 | 5/2016 |
| WO | 2016144438 | 9/2016 |
| WO | 2017164967 | 9/2017 |
| WO | 2018147984 | 8/2018 |
| WO | 2019040301 | 2/2019 |
| WO | 2021152468 | 8/2021 |

OTHER PUBLICATIONS

NPL Exam Report for German Patent Application No. 10 2021 101 760.2, dated Sep. 23, 2022 (4 pages).

* cited by examiner

FASTENING CLIP

CROSS-REFERENCE TO RELATED APPLICATIONS

The present application is a national stage application under 35 U.S.C. § 371 of application Serial No. PCT/IB2021/050611, filed on Jan. 27, 2021, and entitled "FASTENING CLIP." The aforementioned application is hereby incorporated herein by reference in its entirety.

BACKGROUND

Fastening clips are, generally used to securely fix two components together. For example, a fastening clip may be used to secure a trim to a panel of a vehicle, say to a window or a door. In one such example, in a vehicle, a sash trim is secured to door panels on the outside at a pillar portion for improving aesthetic appeal of the door panel. The fastening clip is usually integrated to the trim and provided as a protrusion from the surface of the trim and is accommodated in a securing area, such as a slot, provided on the panel to couple the trim to the panel.

BRIEF DESCRIPTION OF DRAWINGS

The detailed description is provided with reference to the accompanying figures. It should be noted that the description and the figures are merely examples of the present subject matter and are not meant to represent the subject matter itself.

Figure 1A:
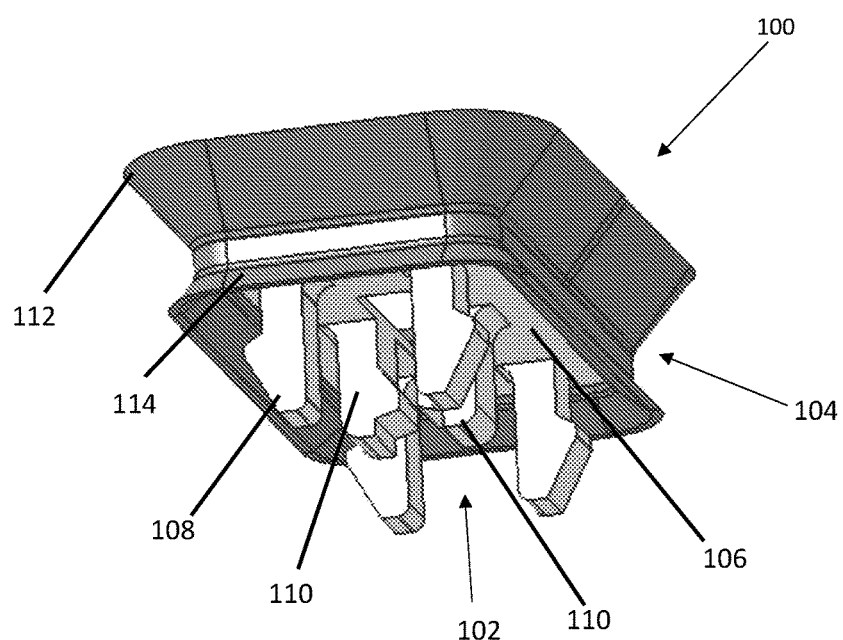
FIG. 1A, FIG. 1B, and FIG. 1C illustrate various views of a fastening clip, in accordance with one example of the present subject matter.

Throughout the drawings, identical reference numbers designate similar elements, but may not designate identical elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Generally, fastening clips are configured to secure a trim to a panel of a door or a widow by providing the fastening clip as an integral protrusion on a surface of the trim. The fastening clip includes a set of snap like structures. In the panel, a part is cut out or a slot is provided in which the snap-like structures of the fastening clip engage, thereby securing the trim with the panel. The fastening clip is usually formed as integrated either by extruding it along with the trim or by integrally joining it to the trim at a later stage.

During installation, however, the fastening clip is susceptible to damage, for example, during insertion or extraction of the trim from the panel. In the case that the fastening clip is damaged, the trim becomes unusable and has to be replaced. Therefore, the overall cost of ownership, for example, of the vehicle using the trim is high. In addition, such damages during manufacturing may lead to disproportionate amount of wastage of the trims which are rendered useless by the breaking of the fastening clip. This problem is aggravated when the trim is generally made of a material for enhancing the aesthetic appeal of the exterior. In the case explained above, breakage of the fastening clip leading to wastage of the trim can substantially influence the economics of manufacturing, as well as costs of servicing. In other words, the manufacturer or the owner may have to bear substantial costs either in wastage or replacements, respectively, in case of damage to the fastening clip. At the same time, damage to the fastening clip is inevitable in cases where the trim has to be removed, for example, when the panel has to be repaired.

Further, the conventional design of the trim with the integrated fastening clip may be unable to provide sealing of the trim to the panel in a manner that it prevents entry of any foreign materials, such as dirt, moisture or rainwater, from entering into the panel. Entry of such foreign materials may damage the panel over a period, further adding to the cost of servicing. Further, in an example where the trim is used on a vehicle panel, due to improper sealing of the trim with the panel, there is a possibility that water or any foreign material may reach the passenger cabin of the vehicle.

At the same time, the conventional design of the trim with the integrated fastening clip requires a relatively high insertion force. A conventionally designed fastening clip is inserted into an oblong, rectangular slot provided in the panel. The fastening clip is so designed that the length of the fastening clip, i.e., the length of each snap-like structure on the fastening clip, is almost equal to the length of the oblong slot in the panel. Due to such a lengthy design of the snap-like structures, the flexibility of the snap-like structures is adversely affected and requires a considerable amount of force in being inserted into the slot. It is therefore cumbersome from an assembly point of view, for the operator to assemble the trim to the panel, and as a result lead to low efficiency in assembly, thereby, leading to low production or manufacturing pace.

In addition, the trim may have various shapes depending on the type of panel it has to be used on. For instance, in case of a vehicle, the trim has a curved shape at a rear or a front pillar of the vehicle and has a generally flat shape at a side pillar of the vehicle where the trim is flat. Therefore, from the open side of the trim, the distance of the wall of the trim may vary according to the design of the trim. For instance, the trim used at the rear end of the vehicle has a curved shape, and accordingly the distance of the wall of the trim from the open side will be higher than in the case of the trim used at a side pillar of the vehicle which has a flatter shape. In cases where the distance between the open end and the wall of the trim is large, for example, where the trim has a curved shape, the snap-like structures extend farther from the trim, i.e., have a longer overhang, the susceptibility of the snap-like structures to breakage is high. In addition, in cases where the distance between the panel and the trim varies, different lengths of the fastening clip may have to be made, for instance, by extrusion, at difference locations on the same trim. Accordingly, the time and cost involved in production of such a trim may be considerably high.

Examples of a fastening clip, for securing a first component, such as a trim, to a second component, such as a panel are described herein. In one example, the fastening clip may be used in vehicular applications where the trim, such as a sash trim, is to be mounted to the panel of the vehicle, for instance, one of the pillars adjacent to the door. The fastening clip can be formed as a separate component such that it is first detachably engaged with the trim and then used to secure the trim to the panel. Since the fastening clip is detachably attached and not integrated with the trim, in case the fastening clip breaks, the trim may not have to be replaced and the same trim may be reused. Therefore, the maintenance cost of the fastening clip is low.

The fastening clip can include a body portion and a collar surrounding the body portion. The body portion can include a plurality of engagement portions and a locking element, each of the engagement portion and the locking element protruding from a flat surface of the body portion of the fastening clip. The collar can include a first flange and a second flange. The fastening clip is coupled to the trim using the locking element and when the fastening clip is coupled to the trim, the first flange abuts with the surface of the trim. Further, the panel is coupled with the fastening clip by the cooperation of engagement portions. When the panel is coupled with the fastening clip, the second flange abuts with surface of the panel, as will be explained later.

For the purpose of mounting the fastening clip to the trim, the trim includes a mounting bridge extending from the surface of the trim. The locking element of the fastening clip can engage with the mounting bridge of the trim, thereby securing the fastening clip with the trim. The trim can then be coupled with the panel using the fastening clip. The panel includes a slot which is configured to receive at least a portion of the fastening clip. Each of the engagement portions of the fastening clip is formed as snap-fit lug and have a wedge type structure. The snap type feature of the engagement portions can snap and lock with the slot to engage the trim with the panel. In an example, at least the engaging portions of the fastening clip are designed in a manner that the engaging portions of the fastening clip can buckle or break when an extraction force exceeding a threshold force is applied on the trim to disengage the trim from the panel. In such a case, the fastening clip may have to be replaced. In another example, the engaging portions may be designed in a manner that they remain intact when the extraction force is applied to disengage the trim from the panel. In other words, the fastening clip can also be designed to be reusable along with the trim.

Further, when the fastening clip is inserted into the slot provided in the panel, the engagement portions of the fastening clip come into contact with only the corners of the slot and not the entire length of the slot. In other words, the engagement portions of the fastening clip are not continuous, and as a result, the flexibility of the engagement portion with respect to the panel is more. As a result of increased flexibility, the insertion force of the fastening clip decreases. Also, due to increased flexibility, it is possible that the fastening clip can be extracted or pulled out from the panel without damage to the engagement portions. So, in a case where the locking element is designed to be not breakable, as explained above, the fastening clip may be reused. Therefore, the reusability of the fastening clip increases. Also, since the fastening clip is not extruded from the trim, the fastening clip may have a different material from that of the trim. Further, since the fastening clip is produced separately, time and cost required in production of the fastening clip is low.

In an example, the body portion and the collar of the fastening clip can be made of the same material. In another example, the body portion and the collar can be formed as separate components where the materials of the body portion and of the collar can be adequately selected to fulfil the functions of the body portion and the collar, as have been detailed later. In addition, as will be explained later, the fastening clip may also, in certain cases, be reusable. Accordingly, for instance, even expensive materials can be used for the body portion as well as the collar.

As explained above, the trim can have various shapes and sizes depending upon the location of the vehicle where the trim is to be used. The distance between the first flange and the surface of the trim that the first flange engages with may vary depending on the shape and size of the trim. So, the first flange may have larger size and a higher degree of flexibility than that of the second flange to accommodate trims of various shapes and sizes. In an example, the fastening clip is be used to mount trims onto a side pillar of the vehicle where the trim is flat and is also be used with the rear or the front pillar of the vehicle where the surface of the trim is curved. With the present design of the fastening clip, the same clip may be used with various trims. Accordingly, the collar of the fastening clip may provide waterproof sealing with the trim, irrespective of the shape and size of the trim. In said example, the collar, whether made of the same material as the body portion or of a different material, may be designed to be flexible.

In an example, in addition to forming the waterproof seal with the trim, the fastening clip can be designed to also form a waterproof seal with the panel. Accordingly, the first flange can also be made flexible to ensure a water proof seal. When the fastening clip is mounted to the trim, the first flange of the collar of the fastening clip abuts against the surface of the trim so as to create a water-proof sealing with the trim. Further, when the fastening clip is in an engaged position with the panel to mount the trim, the second flange of the of the fastening clip is in contact with the surface of the panel so as to create a water proof sealing with the panel. The panel generally has a similar shape irrespective of the location of the vehicle where the panel is to be used. In other words, the distance between the second flange and the panel, in the engaged position, remains almost the same for any panel. Therefore, the length and flexibility of the second flange may be greater than that of the first flange.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1B:
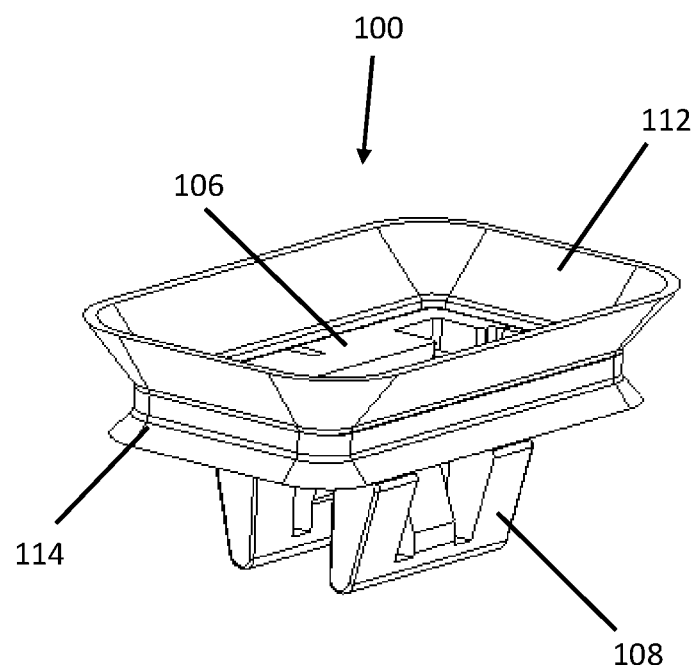
Figure 1C:
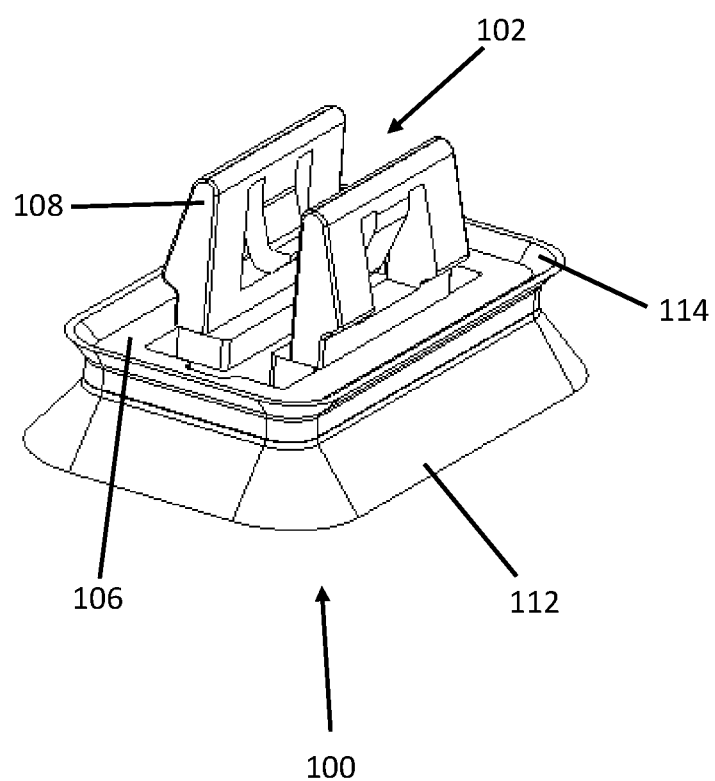

FIG. 1A, FIG. 1B, and FIG. 10 illustrate various perspective views of a fastening clip 100, according to one example of the present subject matter. For the sake of brevity and ease of understanding, FIGS. 1A, 1B, and 10 have been discussed in conjunction with each other.

The fastening clip 100 includes a body portion 102 and a collar 104. The body portion 102 includes a flat surface 106, a plurality of engagement portions 108 and a locking element 110. The first surface 106 has a first face and a second face opposite to the first face. The engagement portions 108 and the locking element 110 extend from the first face of the flat surface 106. The collar 104 includes a first flange 112 and a second flange 114. The first flange 112 extends from the second face in an opposite direction from the engagement portions 108. The second flange 114 extends from the first face in a direction of the engagement portions 108. The first flange 112 and the second flange 114 may be made of a flexible material. The first flange 112 has greater flexibility in comparison to the second flange 114. Further, the first flange also has larger size as compared to that of the second flange 114.

The fastening clip 100 is configured to secure a first component 200, such as a trim, with a second component 300, such as a panel. First, the fastening clip 100 is mounted on the trim using the locking element 110 of the fastening clip 100, as will be explained later. When the fastening clip 100 is mounted on the trim, the first flange 112 abuts with surface of the trim, as will be explained later. Then, the panel is secured with the trim by the operation of engagement portion 108 of the fastening clip 100, as will be explained later. When the trim secures the panel, the second flange 114 abuts with surface of the panel, as will be explained later. In another example, the fastening clip 100 can be initially mounted to the panel 300 and then to the trim 200.

Figure 2:
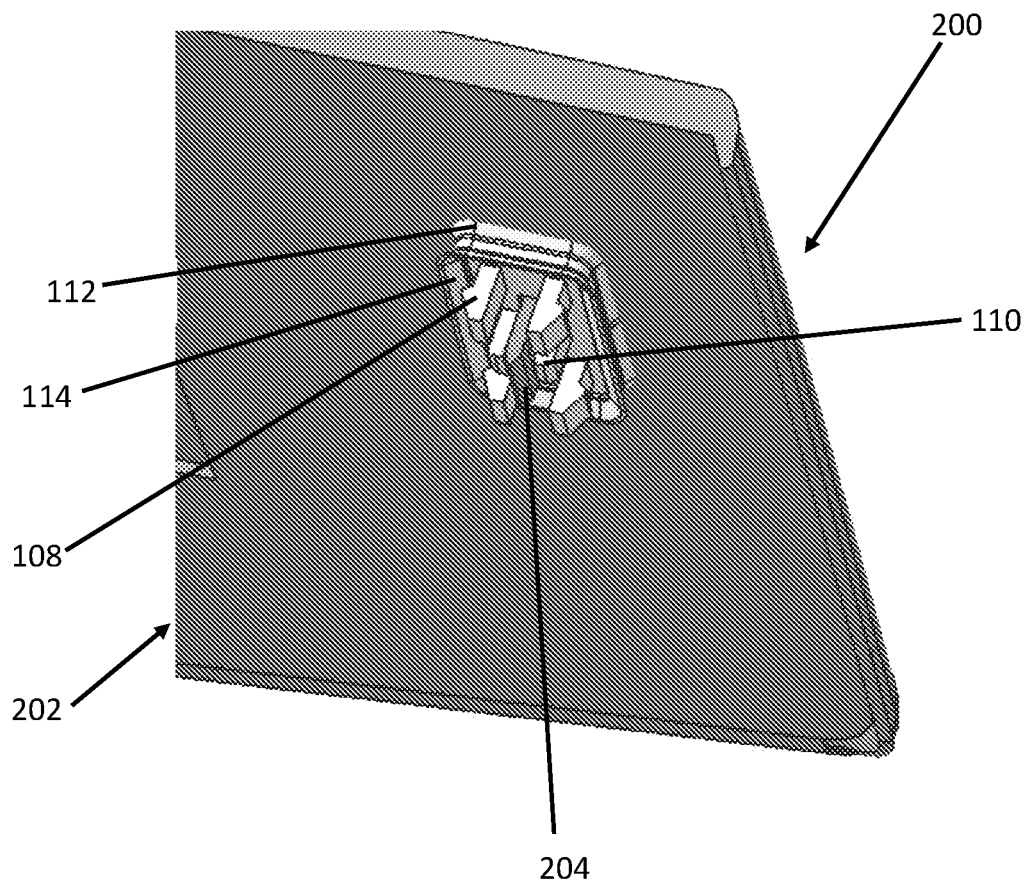
FIG. 2 illustrates a fastening clip mounted on a trim, in accordance with an example of the present subject matter.

FIG. 2 illustrates a fastening clip 100 mounted on a trim 200, according to one example of the present subject matter. The trim 200 comprises of a trim surface 202 and a mounting bridge 204 that extends from the trim surface 202. The mounting bridge 204 includes a hole (not shown) with which the locking element 110 interlocks. First, the fastening clip 100 is mounted on the trim 200. The locking element 110 is inserted in the hole of the mounting bridge 204. In other words, the hole is configured to receive the locking element 110 of the fastening clip 100. The first flange 112 of the collar 104 abuts with the trim surface 202 when the fastening clip 100 is mounted with the trim 200. The first flange 112 is made of a flexible material such as rubber.

When the fastening clip 100 is coupled to the trim 200, the trim surface 202 presses against the first flange 112. The first flange 112 is adapted to flex in a peripherally outwards direction when the fastening clip 100 is coupled to the trim 200. In other words, the distance between the flat surface 106 and the trim surface 202 starts decreasing as the fastening clip 100 is coupled to the trim 200. The trim surface 202 varies depending on the location of the panel. For example, in case of a vehicle, when the trim 200 is needed to secure a side pillar or a middle pillar of a vehicle, the trim surface 202 is flat. When the trim 200 is to secure a rear pillar of the vehicle, the trim surface 202 is curved. The length of the mounting bridge 204 varies as the shape of the trim 200 varies. For instance, the distance between the trim surface 202 and flat surface 106 is more where the trim 200 has a curved shape in comparison to the situation where the trim 200 has a flat shape. Due to the flexible nature of the first flange 112, the fastening clip 100 can be used with varying length of the mounting bridge 204.

When the fastening clip 100 is mounted on the trim 200, the locking element 110 of the fastening clip 100 engages with the hole in the mounting bridge 204 of the trim 200. Accordingly, the fastening clip 100 is detachably attached with the trim 200. Therefore, in an unfavorable scenario, where the fastening clip 100 gets damaged, the trim 200 need not be replaced. The locking element 110 may be breakable, i.e., may break down under impact or excessive load. In one example, the locking element 110 may be made of a brittle material. In a case where a force exceeding a threshold limit is applied, the locking element 110 breaks ensuring that the mounting bridge 204, which is in direct contact with the locking element 110, is not damaged due to the application of excessive force. In other words, the locking element 110 breaks when a force exceeding a threshold force is applied to the fastening clip 100. Further, the locking element 110 can also be made of non-brittle material such as a hard material. The locking element 110, if made of hard material, will be able to withstand excessive forces without causing damage to the mounting bridge 204. In such case, the fastening clip 100 can be extracted from the trim 200 without causing damage to the locking element 110.

The locking element 110 comprises of one or more breakage assisting feature. In one example, the breakage assisting feature may be provided in the form of notches. A portion of the locking element 110 may have a tapered shape with the breakage assisting feature, for example, notches, provided at the extreme ends of the tapered portion. Due to provision of notches, in case of impact or excessive loading, the locking element 110 breaks down at an area near the notch. As a result, the mounted bridge 204 is not damaged. In another example, the breakage assistance feature may be provided by removing material from the locking element 110.

Further, in the mounted position, the first flange 112 of the fastening clip 100 abuts with the trim surface 202 of the trim 200. The contact between first flange 112 and the trim surface 202 provides for a water proof sealing between the fastening clip 100 and the trim 200. The first flange 112 may be made of a material that restricts entry of foreign material, such as dust, moisture, water, etc., that may cause damage to the trim. In one example, the first flange 112 is made of a flexible and waterproof material such as rubber.

Since the trim 200 forms an exterior part of window or door, the material of the trim 200 is chosen in a way to increase the aesthetic appeal. The material of the fastening clip 100 may be different from material of the trim 200. In one example, the fastening clip 100 may have different materials for the body portion 102 and the collar 104. The collar 104 may be made of flexible materials such as rubber. In one example, the collar 104 may be attached to the body portion 102 through different joining processes such as welding, by applying adhesive, etc.

Figure 3:
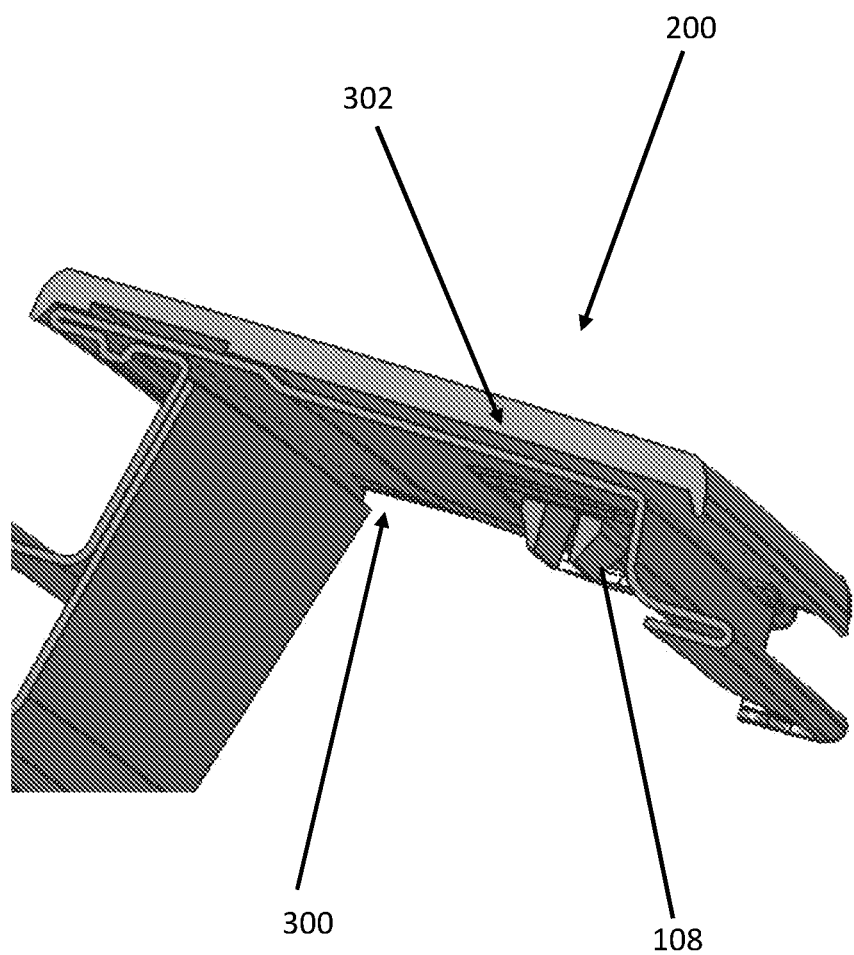
FIG. 3 illustrates a trim secured to a panel using a fastening clip, in accordance with an example of the present subject matter.
Figure 4:
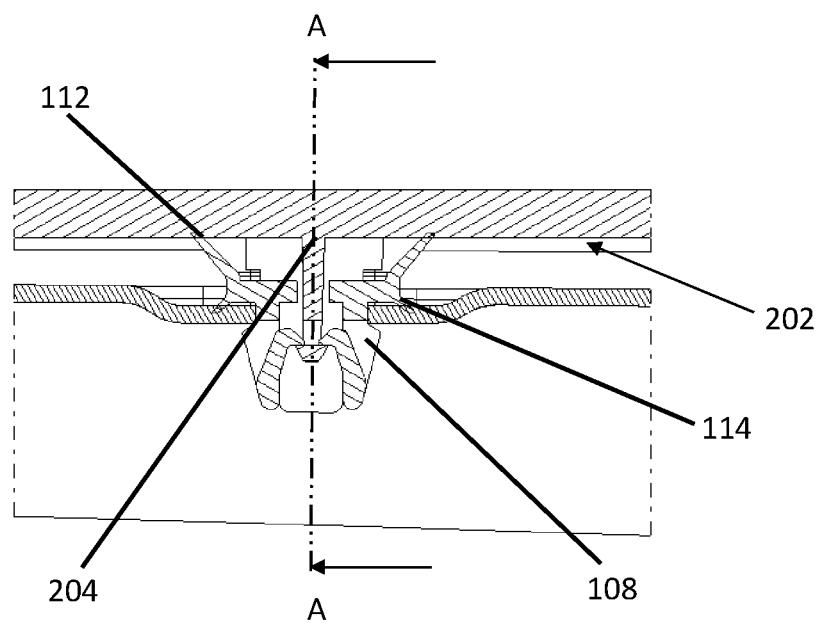
FIG. 4 illustrates a cross-sectional view of a trim secured to the panel using the fastening clip, in accordance with an example of the present subject matter.
Figure 5A:
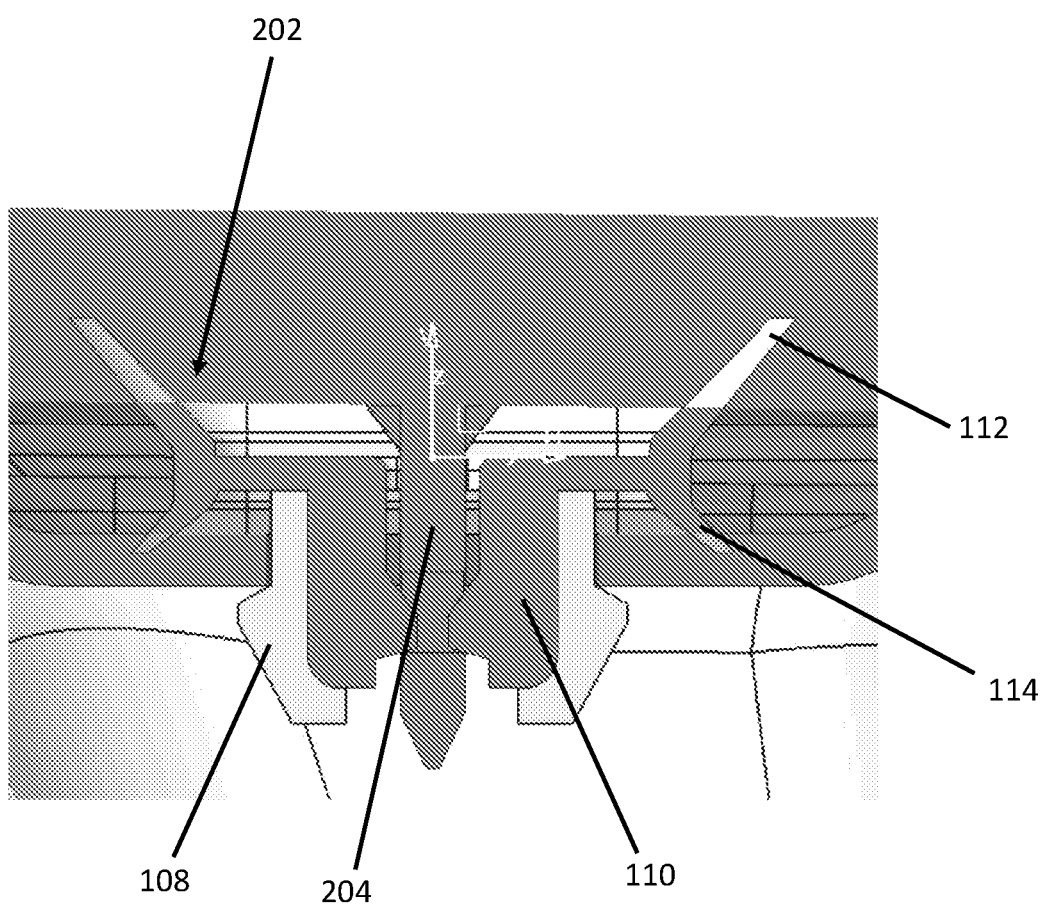
FIG. 5A and FIG. 5B illustrate a magnified cross-sectional view of the trim secured to the panel using the fastening clip, in accordance with an example of the present subject matter.
Figure 5B:
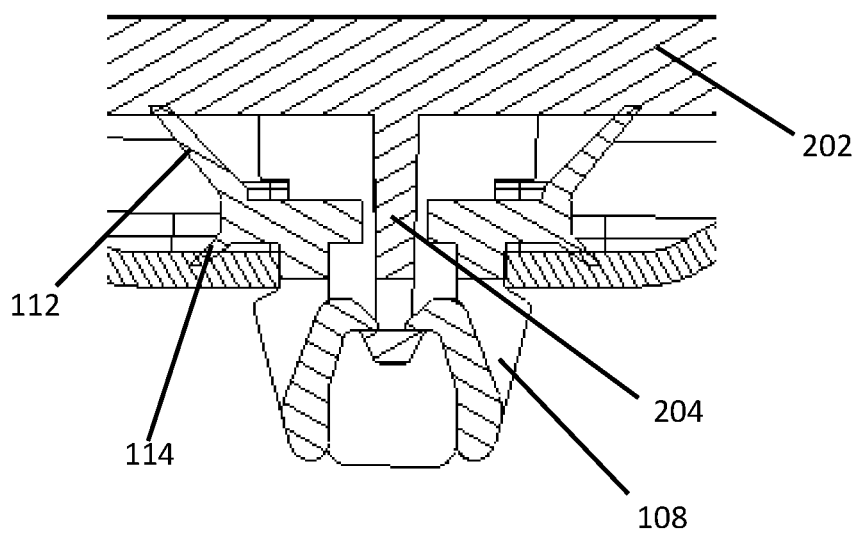
Figure 6A:
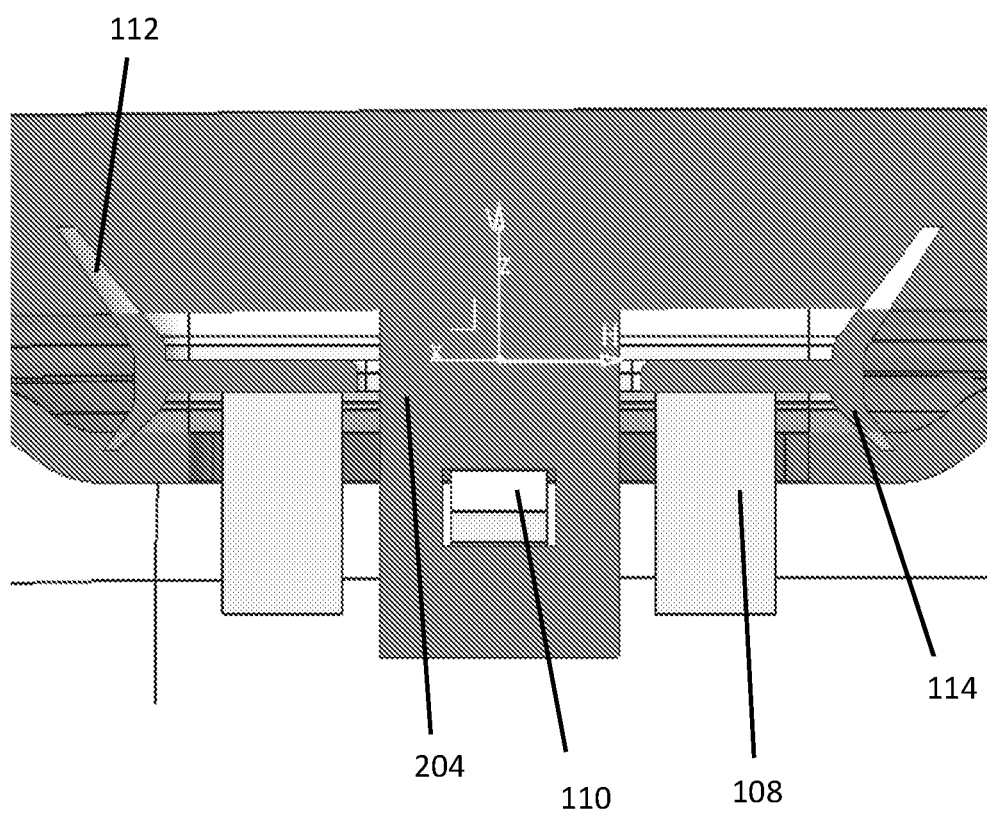
FIG. 6A and FIG. 6B illustrate another cross-sectional view of the trim secured to the panel using the fastening clip, in accordance with an example of the present subject matter.
Figure 6B:
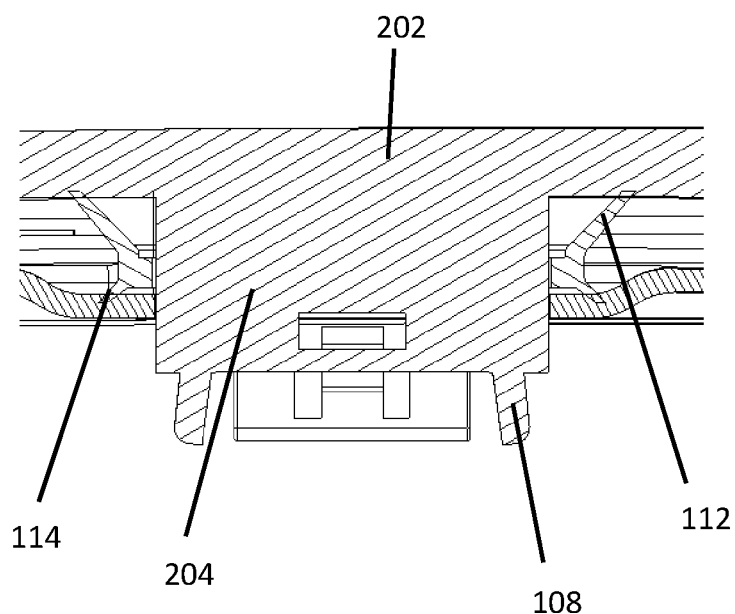

FIG. 3 illustrates a trim 200 securing the panel 300 through a fastening clip 100 mounted on the trim 200. In addition, FIG. 4 illustrates a cross-sectional view of the fastening clip 100, the trim 200, and the panel 300, showing the trim 200 secured to the panel 300 using the fastening clip 100, in accordance with an example of the present subject matter. Further, FIG. 5A and FIG. 5B illustrate a magnified view of the cross-sectional view of the fastening clip 100, the trim 200, and the panel 300. FIGS. 6A and 6B illustrate a side cross-sectional view of the fastening clip 100, the trim 200, and the panel 300 along the section A-A shown in FIG. 4. For the sake of brevity and ease of understanding, FIGS. 3, 4, 5A, 5B, 6A, and 6B have been described in conjunction with each other.

In one example, the panel 300 can be a door or a window of a vehicle. In another example, the panel 300 may be a non-vehicular part, such as a wall molding, used in interior of homes and offices. The panel 300 includes a slot 302 which may be an oblong, rectangular shape or any other geometrical shape. The slot 302, in one case, may be provided on surface of the panel 300 by punching out a portion of the panel 300, for example, with the help of a die. After the fastening clip 100 is mounted on the trim 200, the slot 302 of the panel 300 is configured to receive a portion of the fastening clip 100 to secure the panel 300 with the trim 200.

The engagement portions 108 of the fastening clip 100 is inserted into the slot 302 of the panel 300. The engagement portions 108 of the fastening clip 100 formed as snap-fit lug and have a wedge type structure. The wedge type structure of the engagement portions 108 enables the fastening clip 100 to lock with the panel 300. The snap type feature of the engagement portions can snap and lock with the slot to engage the trim with the panel.

In the locked position, the second flange 114 of the fastening clip 100 abuts with surface of the panel 300. The contact between second flange 114 and surface of the panel 300 provides for a waterproof sealing between the fastening clip 100 and the panel 300. Further, when the fastening clip 100 is inserted into the slot provided in the panel, the engagement portions of the fastening clip 100 come into contact with only the corners of the slot and not the entire length of the slot. In other words, the engagement portion 108 of the fastening clip 100 is not continuous, and therefore, the length of the engagement portion 108 is less than the length of the slot 302. Since the engagement portion 108 of the fastening clip 100 is not continuous, the flexibility of the engagement portion 108 with respect to the panel 300 increases. As a result of increased flexibility, the insertion force of the fastening clip 100 decreases. In one example, the engagement portion 108 includes a straight portion followed by a locking portion which locks with the slot 302 in the assembled position of the fastening clip 100.

When the trim 200 is extracted from the panel 300, for example, for maintenance purposes, in an example, the engagement portion 108 of the fastening clip 100 may be designed to break-off. Since the fastening clip 100 is detachably coupled to the trim 200, the trim 200 is not required to be replaced. Therefore, in such an example, the engagement portion 108 may be made of a cheaper, brittle material. In another example, the engagement portion 108 may be designed in such a manner that when the extraction force is applied, the engagement portion 108 is able to withstand the extraction force without breaking and is withdrawn from the slot 302 of the panel without breaking. In an example, where the fastening clip 100 is extracted from the trim 200 without breakage of the locking element 110, the fastening clip 100 can be reused if the engagement portions 108 do not brake off while extracting the fastening clip 100 from the panel 300.

In the latter example, for instance, the engagement portion 108 may be provided with a beveled portion at a free end of the wedge structure away from the flat surface 106. In other words, the engagement portions 108 have a beveled portion at the point where the engagement portions 108 contacts and locks with the slot 302. Such a design allows for extraction of the fastening clip 100 from the panel 300 without breaking. For instance, due to the beveled shape, the extraction force required to extract may be substantially greater than the insertions force required to insert the fastening clip 100 into the slot 302. But even upon the application of such a high force, the engagement portion 108 may not be broken and may allow reusability of the fastening clip 100. Additionally or alternatively, the engagement portion 108 may be flexibly joined to the flat surface 106 of the fastening clip 100. In other words, the engagement portion 108 may be provided with flexural ability so that the fastening clip 100 can be withdrawn from the panel 300 without breaking.

In one example, the fastening clip 100 is a sash clip. The trim 200 is a sash trim. The panel 300 is a door of a vehicle. In the vehicle, the fastening clip 100 is first mounted on the trim 200, and then the trim 200 secures the panel 300 of the vehicle through the fastening clip 100. However, as would be understood by a person skilled the art, the fastening clip 100, the trim 200, and the panel 300 may be any adequate application for the function that the fastening clip 100 is usable.

Although examples for the fastening clip 100 for mounting the trim 200 to the panel 300 have been described in language specific to structural features and/or methods, it is to be understood that the appended claims are not limited to the specific features described. Rather, the specific features are disclosed as examples of the fastening clip 100.

We claim:

1. A fastening clip to secure a first component and a second component, the fastening clip comprising:
   a body portion comprising:
      a flat surface having a first face and a second face;
      a locking element extending from the first face of the flat surface,
         wherein the locking element is configured to detachably couple to the first component,
         wherein the locking element comprises at least one breakage-assisting structure; and
      a plurality of engagement portions extending from the first face of the flat surface,
         wherein the plurality of engagement portions is configured to detachably couple to the second component; and
   a collar formed at an edge of the body portion, the collar comprising a first flange extending from the second face in an opposite direction from the plurality of engagement portions, wherein the first flange is flexible and is configured to abut against the first component.

2. The fastening clip as claimed in claim 1, wherein the locking element is breakable upon application of a threshold force at the at least one breakage-assisting structure.

3. The fastening clip as claimed in claim 1, wherein the first flange is to flex peripherally outwards to accommodate varying shapes of the first component.

4. The fastening clip as claimed in claim 1, wherein the collar further comprises a second flange extending from the first face in a direction of the plurality of engagement portions, wherein the second flange is flexible and is configured to abut against the second component.

5. The fastening clip as claimed in claim 4, wherein the first flange has a greater flexibility than the second flange.

6. The fastening clip as claimed in claim 1, wherein each of the plurality of engagement portions is formed as a snap-fit lug and has a wedge structure.

7. The fastening clip as claimed in claim 6, wherein the plurality of engagement portions comprises a beveled portion formed at a free end of the wedge structure away from the flat surface.

8. The fastening clip as claimed in claim 1, wherein the locking element is tapered or notched to define the at least one breakage-assisting structure.

9. The fastening clip as claimed in claim 8, wherein the first flange is to flex peripherally outwards to accommodate varying shapes of the first component.

10. The fastening clip as claimed in claim 8, wherein each of the plurality of engagement portions is formed as a snap-fit lug and has a wedge structure.

11. The fastening clip as claimed in claim 10, wherein the plurality of engagement portions comprises a beveled portion formed at a free end of the wedge structure away from the flat surface.

12. The fastening clip as claimed in claim 8, wherein the locking element is breakable upon application of a threshold force to a breakage-assisting structure formed in the locking element.

13. A fastening clip to secure a first component and a second component, the fastening clip comprising:
   a body portion comprising:
      a flat surface having a first face and a second face;
      a locking element extending from the first face of the flat surface, wherein the locking element is configured to detachably couple to the first component; and
      a plurality of engagement portions extending from the first face of the flat surface, wherein the plurality of engagement portions is configured to detachably couple to the second component; and
   a collar formed at an edge of the body portion, the collar comprising:
      a first flange extending from the second face in an opposite direction from the plurality of engagement portions, wherein the first flange is flexible and is configured to abut against the first component; and
      a second flange extending from the first face in a direction of the plurality of engagement portions, wherein the second flange is flexible and is configured to abut against the second component,
      wherein the first flange has a flexibility that is greater than a flexibility of the second flange.

14. A fastening clip to secure a first component having a mounting bridge extending therefrom and a second component having a slot, the fastening clip comprising:
   a body portion comprising:
      a flat surface having a first face and a second face;
      a locking element extending from the first face of the flat surface,
         wherein the locking element is configured to detachably engage and couple to the mounting bridge of the first component; and
      a plurality of engagement portions extending from the first face of the flat surface,
         wherein the plurality of engagement portions is configured to detachably couple via the slot of the second component; and
   a collar formed at an edge of the body portion, the collar comprising a first flange extending from the second face in an opposite direction from the plurality of engagement portions and configured to abut against the first component.

15. The fastening clip as claimed in claim 14, wherein the locking element comprises a pair of snap-fit lugs configured to receive and secure with the mounting bridge.

16. The fastening clip as claimed in claim 15, wherein each of the pair of snap-fit lugs comprises a wedge structure.

17. The fastening clip as claimed in claim 15, wherein each of the pair of snap-fit lugs comprises a wedge structure configured to engage the mounting bridge.

18. The fastening clip as claimed in claim 15, wherein each of the pair of snap-fit lugs comprises a wedge structure configured to engage an opening formed in the mounting bridge.

19. The fastening clip as claimed in claim 14, wherein each of the plurality of engagement portions is a snap-fit lug configured to engage the slot.

20. The fastening clip as claimed in claim 19, wherein the snap-fit lug comprises a wedge structure configured to engage the slot.

* * * * *